June 17, 1958
M. O. SHRADER ET AL
2,839,534
PRODUCTION OF 2-CHLOROPYRIDINE
Filed Aug. 31, 1956
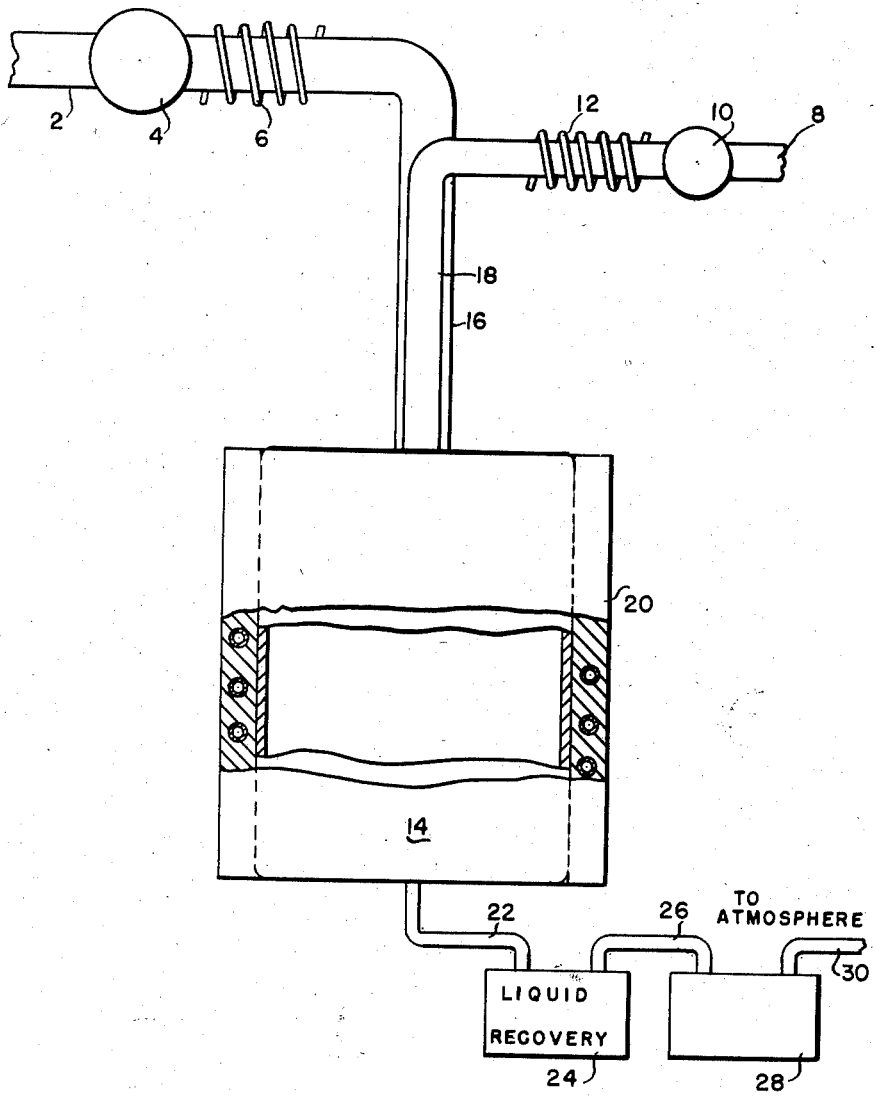
INVENTORS
MARVIN O. SHRADER
HAROLD L. DIMOND
JOACHIM C. E. SCHULT
BY Cushman, Darby & Cushman
ATTORNEYS

United States Patent Office 2,839,534
Patented June 17, 1958

2,839,534

PRODUCTION OF 2-CHLOROPYRIDINE

Marvin O. Shrader, Harold Lloyd Dimond, and Joachim C. E. Schult, Pittsburgh, Pa., assignors to Pittsburgh Coke & Chemical Company, Pittsburgh, Pa., a corporation of Pennsylvania Application August 31, 1956, Serial No. 607,522

12 Claims. (Cl. 260—290)

This invention relates to a process for producing 2-chloropyridine.

It is well known to those skilled in the art that pyridine is one of the more stable organic compounds and except for condensation reactions with the tertiary nitrogen atom, the pyridine nucleus is notoriously resistant to chemical reagents. Chlorination is particularly difficult, requiring high temperatures, and the reaction often results in by-product tars and free carbon with a corresponding loss of expensive raw materials; in fact, the production of chloropyridine is so fraught with operational difficulties that the chloropyridines are commonly prepared by lengthy and laborious indirect methods. For example, 2-chloropyridine is produced commercially by the amination of pyridine followed by diazotization and replacement of the diazo group with chlorine.

The direct chlorination using molecular chlorine has been described by Wibaut and Nicolai, Recueil des Travaux Chemiques, volume 58, 709 (1939). According to these investigators, optimum conditions for the preparation of 2-chloropyridine required vapor phase reaction at 250° C. to produce yields of 30–35% of the desired material. It was also disclosed that at temperatures above 290° C. the chlorination proceeds with violence, and charring results, and considerable amounts of disubstitution occur even when an excess of pyridine is employed. These investigators also used a packed column for their reaction.

It is an object of the present invention to simplify the procedural steps in the formation of 2-chloropyridine from pyridine.

A further object is to form 2-chloropyridine in increased yields over known methods.

An additional object is to reduce the by-products and charring which normally occurs in the high temperature vapor phase chlorination of pyridine.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained and that 2-chloropyridine can be produced in excellent yields by vapor phase chlorination in the presence of sulfur dioxide. By this process it is possible to obtain yields as high as 82.1% and yields of 65–70% are regularly attained. Under the preferred operating conditions the yields are consistently over 70%.

There can be employed chlorine gas admixed with sulfur dioxide or any source of sulfur dioxide. The sulfur dioxide is generally used in an amount at least the molar equivalent of the chlorine, although preferably an excess of sulfur dioxide is employed for reasons which will later become apparent.

The preferred source of sulfur dioxide is sulfuryl chloride ($SO_2Cl_2$). This compound essentially dissociates into sulfur dioxide and chlorine at the reaction temperatures employed and, hence, also serves as the chlorine source. Even when sulfuryl chloride is employed, it is frequently desirable to add additional sulfur dioxide.

While Wibaut et al. employ a packed column reaction zone, it has been found that according to the present process superior results are obtained with a free or unpacked reaction zone.

To avoid excessive charring, it has been found imperative to have the reaction occur over a reaction zone rather than in a hot spot. The use of excess sulfur dioxide has been found suitable to spread the reaction out from a hot spot. A hot spot will be noted by excessive charring or glowing during the reaction. If no such hot spot develops, then the use of excess sulfur dioxide can be omitted. Similarly, the use of excess sulfur dioxide can be stopped after a hot spot which has developed is spread out into a reaction zone.

While it is possible to carry out the present reaction at temperatures between 300° C. and 450° C. to obtain outstanding yields, the temperature should be between 330° C. and 400° C., and preferably between 340° C. and 370° C. The temperature control is extremely important and the results obtained are indeed surprising since, according to the prior art, carrying out the chlorination of pyridine at the temperatures employed would be expected to result in excessive formation of polychlorinated by-products and the concomitant loss of pyridine by charring.

The mol ratio of chlorinating agent to pyridine is normally not less than 1 to 4 or greater than 1 to 1. Desirably, the pyridine is present in excess. By this is meant the mol ratio of available chlorine, e. g., with sulfuryl chloride there is used from 0.25 to 1 mol of sulfuryl chloride for each mol of pyridine. Similarly, when using a mixture of chlorine gas and sulfur dioxide, from 0.25 to 1 mol of clhorine is employed per mol of pyridine. The sulfur dioxide is used in a molar amount at least equal to the molar amount of chlorine gas and, as previously explained, can be used in excess thereof. In general, not more than 2 mols of sulfur dioxide are employed per mol of pyridine, as beyond this amount the reaction is slowed down excessively without corresponding improved yields.

It has also been found desirable to surround the reaction zone with one or more heat exchangers to facilitate the removal of the heat of reaction and thus further control the reaction temperature, as well as to rapidly bring the reactants to the desired temperature.

While the chlorinating agent and pyridine can be mixed in any manner, preferably the chlorinating agent is introduced into an atmosphere of pyridine vapor. The present reaction definitely is a vapor phase one and, while preferably atmospheric pressure is employed, it is to be understood that either sub-atmospheric or super-atmospheric pressure can be employed.

The present process has the further advantage over Wibaut et al. in that the reactor is best operated in a vertical position which will permit immediate drainage of reaction products from the reaction and thus reduce thermal charring to a minimum.

The single figure of the drawing illustrates an apparatus for carrying out the present process on a laboratory scale.

In the operation of the process, pyridine is fed via line 2 through flowmeter 4 into vaporizer 6 where the pyridine is heated to approximately 300° C. Simultaneously, and independently, sulfuryl chloride (or a mixture of chlorine and sulfur dioxide) is fed via line 8 through flowmeter 10 into vaporizer 12 where the sulfuryl chloride is also heated to approximately 300° C. The vapors are then led separately into the glass reactor 14 by means of a concentric, or double piping system, in which the pyridine vapor flows through the annulus 16 and the sulfuryl chloride flows through the center pipe 18. The reactor is a cylinder having a diameter of 1.14 inches and a length of 32 inches, and is preferably surrounded by heat exchanger 20, preferably of the high boiling liquid type to facilitate control of the reaction temperature. The feed rates, and temperatures of the liquid in the heat exchanger surrounding the reactor, are then so adjusted as to produce a reaction zone rather than a hot spot. If the reaction localizes into a hot spot, excessive charring results and may even proceed with sufficient violence to maintain a glowing discharge. As previously explained, this can be eliminated by simply introducing sulfur dioxide along with the sulfuryl chloride vapor at such velocity as to spread the hot spot into a reaction zone. The reaction products leaving reactor 14 are condensed by passing through tubular condenser 22 and the liquid product is recovered in vessel 24. Non-condensable gases pass through tube 26 into vessel 28 where they are scrubbed with water before venting to the atmosphere through outlet pipe 30. The 2-chloropyridine obtained in vessel 24 is isolated by conventional methods, such as neutralization and fractionation.

In the specification and claims all parts and percentages are by weight unless otherwise indicated.

*Example 1*

In the course of 53 minutes, 3.15 mols of pyridine and 1.05 mols of sulfuryl chloride are introduced into the previously described apparatus with the reaction zone profile showing a maximum temperature of 355° C. The reaction initially localized into a hot spot with obvious charring, but immediately was spread into a zone by introducing sulfur dioxide (along with the sulfuryl chloride), thus spreading the reaction hot spot into a reaction zone of approximately 2 linear inches within the reactor. Working up the material by neutralization with sodium hydroxide, steam distillation, extraction with benzene, and fractional distillation gave 2.4 mols of recovered pyridine, 0.05 mol polychlorinated pyridines, and 0.72 mol of 2-chloropyridine, which is a yield of 68% of theory of the latter.

*Example 2*

In a similar experiment in which the reaction hot spot was allowed to glow with a recorded temperature of 390° C., excessive charring occurred and the yield was reduced to 20% of theory.

*Example 3*

In an experiment in which the reaction hot spot was allowed to reach 450° C., although a glowing discharge was not observed, excessive charring occurred and the yield was 40% of theory.

*Example 4*

In an operation at 300–305° C. hot zone temperature, little to no charring occurred, but the yield was only 20–30% of theory.

*Example 5*

An experiment in which the reaction zone temperature was 347–360° C., with the reaction at all times being a zone rather than a hot spot, the yield was 77.5% of theory.

*Example 6*

Using the same apparatus as in Example 1, 1.51 mols of pyridine vapor were reacted with .69 mol of a vaporized mixture of $SO_2Cl_2$ (99 pts. by volume) and $S_2Cl_2$ (1 pt. by volume) at 329–337° C. over a 30 minute period.

64.3 g. (.57 mol) of pure 2-chloropyridine were obtained in this experiment, which corresponded to a yield of 82.1%.

It should be noted that in Example 6, a minor amount of sulfur monochloride was utilized in addition to the sulfuryl chloride. In general, 0.1 to 2 parts by volume of sulfur monochloride can be employed per 100 parts by volume of sulfuryl chloride. The volume measurements in the specification were made at room temperature (about 21°C.).

We claim:

1. A process of producing 2-chloropyridine comprising chlorinating pyridine in the vapor phase at a temperature of 300° C. to 450° C. in the presence of sulfur dioxide in a molar proportion in excess of the molar amount of pyridine.

2. A process according to claim 1 wherein the temperature is between 330 and 400° C.

3. A process according to claim 1 wherein the chlorine and sulfur dioxide are formed in situ from sulfuryl chloride.

4. A process according to claim 3 wherein the sulfuryl chloride is diluted with excess sulfur dioxide.

5. A process according to claim 1 wherein the mol ratio of chlorinating agent to pyridine is between 1 to 4 and 1 to 1.

6. A process according to claim 5 wherein the chlorinating agent is sulfuryl chloride.

7. A process according to claim 6 wherein the temperature is between 330 and 370° C.

8. A process of producing 2-chloropyridine comprising chlorinating pyridine with sulfuryl chloride in the vapor phase in an unimpeded reaction zone at a temperature of about 345–360° C. the sulfuryl chloride being used in an amount of at least about 0.25 mol per mol of pyridine.

9. A process according to claim 1 wherein the chlorinating agent is introduced into an atmosphere of pyridine vapor.

10. A process according to claim 1 wherein the chlorination is carried out with sulfuryl chloride in the presence of a minor amount of sulfur monochloride.

11. A process according to claim 10 wherein the temperature is maintained between about 329 and 337° C.

12. A process of producing 2-chloropyridine in the vapor phase at a temperature of between 330° C. and 370° C. in the presence of at least about 0.25 mol of sulfur dioxide per mol of pyridine.

References Cited in the file of this patent

UNITED STATES PATENTS

| | | |
|---|---|---|
| 1,977,662 | Wibaut et al. | Oct. 23, 1934 |
| 2,563,797 | Stedehouder et al. | Aug. 7, 1951 |

FOREIGN PATENTS

| | | |
|---|---|---|
| 400,191 | Germany | Aug. 4, 1924 |

OTHER REFERENCES

Houben: Die Methoden der Org. Chem. (3rd ed.), vol. 3, pages 1105–9 (1943).